(12) United States Patent
Barber et al.

(10) Patent No.: US 7,041,352 B2
(45) Date of Patent: May 9, 2006

(54) THERMOPLASTIC STRUCTURES FOR THE STORING AND TRANSPORTING OF ORGANOLEPTIC SENSITIVE PRODUCTS

(75) Inventors: Victor Jason Barber, Kaukauna, WI (US); Roberto Siu, Neenah, WI (US)

(73) Assignee: Pechiney Emballage Flexible Europe, (FR)

( * ) Notice: Subject to any disclaimer, the term of this patent is extended or adjusted under 35 U.S.C. 154(b) by 0 days.

(21) Appl. No.: 10/611,007

(22) Filed: Jul. 1, 2003

(65) Prior Publication Data

US 2005/0003125 A1    Jan. 6, 2005

(51) Int. Cl.
B32B 27/32 (2006.01)
B32B 27/08 (2006.01)

(52) U.S. Cl. ............... 428/36.7; 428/474.4; 428/476.3; 428/516; 428/36.7

(58) Field of Classification Search ............. 428/474.4, 428/476.3, 516, 520, 36.7
See application file for complete search history.

(56) References Cited

U.S. PATENT DOCUMENTS

| | | |
|---|---|---|
| 4,256,256 A | 3/1981 | Meyers |
| 4,284,672 A | 8/1981 | Stillman |
| 4,286,746 A | 9/1981 | Gorshe |
| 4,323,586 A | 4/1982 | Long |
| RE31,137 E | 2/1983 | Ossian et al. |
| 4,402,172 A | 9/1983 | Krueger |
| 4,420,097 A | 12/1983 | Motsenbocker |
| 4,556,590 A | 12/1985 | Martin |
| 4,793,486 A | 12/1988 | Konopka et al. |
| 5,360,648 A * | 11/1994 | Falla et al. .................. 426/127 |
| 5,374,459 A * | 12/1994 | Mumpower et al. ....... 428/36.7 |
| 5,459,978 A | 10/1995 | Weiss et al. |
| 5,721,025 A * | 2/1998 | Falla et al. ................. 428/35.2 |
| 5,836,445 A | 11/1998 | Provonchee |
| 5,942,579 A * | 8/1999 | Falla et al. .................. 525/240 |
| 6,067,803 A | 5/2000 | Wolsey et al. |
| 6,068,933 A * | 5/2000 | Shepard et al. .......... 428/474.4 |
| 6,117,465 A * | 9/2000 | Falla .......................... 426/127 |
| 6,237,308 B1 * | 5/2001 | Quintin et al. ................. 53/451 |
| 6,294,210 B1 * | 9/2001 | Kuo ........................... 426/127 |
| 6,562,476 B1 * | 5/2003 | Shepard et al. .......... 428/475.8 |
| 6,794,053 B1 * | 9/2004 | Quintin et al. .............. 428/516 |

FOREIGN PATENT DOCUMENTS

EP    1 036 742 A1    9/2000

* cited by examiner

Primary Examiner—D. Lawrence Tarazano
(74) Attorney, Agent, or Firm—McDermott Will & Emery LLP

(57) ABSTRACT

The present invention relates to thermoplastic structures wherein the inner sealant layer of said structure comprises a polyethylene having a density from about 0.88 to about 0.96 and wherein the polyethylene is processed at a temperature ranging from about 150° F. to about 500° F. in order to prevent the release of extractable materials. The thermoplastic structures can be used independently to form a flexible packaging film or can be affixed to a second film structure or substrate to form a flexible packaging film. The flexible packaging films can be used for forming containers for the storing and transporting of organoleptic sensitive products.

9 Claims, 2 Drawing Sheets

| | |
|---|---|
| XXXXXXXX | ~ 10 |
| XXXXXXXX | ~ 12 |
| XXXXXXXX | ~ 14 |
| XXXXXXXX | ~ 16 |
| XXXXXXXX | ~ 18 |
| XXXXXXXX | ~ 14 |
| XXXXXXXX | ~ 20 |

| XXXXXXXX | ~ 10 |
| XXXXXXXX | ~ 12 |
| XXXXXXXX | ~ 14 |
| XXXXXXXX | ~ 16 |
| XXXXXXXX | ~ 18 |
| XXXXXXXX | ~ 14 |
| XXXXXXXX | ~ 20 |

| XXXXXXXX | ~ 22 |
| XXXXXXXX | ~ 10 |
| XXXXXXXX | ~ 12 |
| XXXXXXXX | ~ 14 |
| XXXXXXXX | ~ 16 |
| XXXXXXXX | ~ 18 |
| XXXXXXXX | ~ 14 |
| XXXXXXXX | ~ 20 |

Fig. 4

$\overline{\underline{\text{XXXXXXXXX}}}$ ~ 20

US 7,041,352 B2

THERMOPLASTIC STRUCTURES FOR THE STORING AND TRANSPORTING OF ORGANOLEPTIC SENSITIVE PRODUCTS

FIELD OF THE INVENTION

The present invention relates to thermoplastic structures wherein at least one layer comprises a polyethylene having a density of about 0.88 to about 0.96. These thermoplastic structures are useful for the storing and transporting of organoleptic sensitive products.

BACKGROUND OF THE INVENTION

Organoleptic sensitive products such as water have been successfully packaged in bottles made from polyesters and other rigid resin options for some time. This type of packaging is particularly suitable for water because the polyester resin, which comprises the bottle does not impart any detectable undesirable taste or flavor to the water stored therein.

It is theorized that the unwanted taste or flavor that may be found in packaged beverages such as water can be attributed to extractables from certain resins, which are leached from the resins used in the packaging making process. Specifically, it is theorized that the inner sealant layer resin of the packaging film structures plays the most important role because it is this layer, which comes in direct contact with the beverage. Therefore bottles made from polyesters and other rigid resin alternatives are desirable for packaging water because minimal extractables are usually recorded. While bottles made from polyesters or rigid resins are desirable from the standpoint of flavor or taste, they do have a number of undesirable features. These undesirable features include rigidity, excess weight, and limited portability.

Therefore a need exists in the packaging industry for a container for storing and transporting of organoleptic sensitive products such as water wherein the resin particularly the resin or resins which comprise the layer which comes in direct contact with the product does not (or minimally) impart an undesirable flavor or taste to the product stored therein. The container will also need to possess the desirable features of flexibility, low weight, and convenient portability.

In view of the above-identified need the Applicants have discovered a thermoplastic structure wherein the resin or resins which comprise the inner sealant layer of the structure will not (or minimally) impart any detectable undesirable taste or flavor to the product stored therein. The thermoplastic structure can then be affixed to a second film structure or substrate or can be used as a stand-alone structure to form flexible packaging films which are useful for forming containers for the storing and transporting of organoleptic sensitive products, such as water, which containers possess the desirable features described above.

DESCRIPTION OF THE PRIOR ART

U.S. Pat. No. 4,284,672 to Stillman discloses a laminated packaging film useful in producing such items as pouches and containers for liquids, comprising an outer layer of balanced biaxially oriented thermoplastic polymer, a middle layer of flexible metal foil, an inner layer of heat-sealable, rubber modified high density polyethylene, or ethylene copolymer and an adhesive layer between the middle and inner layers. The pouches and containers formed by this film are exceptionally strong, durable and flexible, but have not shown to be inert enough to prevent imparting any detectable undesirable taste or flavor to sensitive beverages and liquids such as water.

SUMMARY OF THE INVENTION

The present invention relates to thermoplastic structures wherein the resin or resins which comprise the inner sealant layer of said structures will not (or will minimally) impart any detectable undesirable taste or flavor to the product stored therein. The thermoplastic structures of the present invention can be used as a stand-alone film or can be affixed to a second film structure or substrate to form a flexible packaging film. The present invention also relates to a sealant composition for use in packaging of organoleptic sensitive products.

The flexible packaging films of the present invention and the structures produced therefrom permits the production of lightweight, flexible containers for the transporting and storing of organoleptic sensitive products. The selection of the appropriate inner sealant resin permits the containers formed therefrom to be used to store and transport organoleptic sensitive products such as water for periods of time without imparting or minimally imparting to the product any undesirable taste or odor. Additionally the containers of the present invention due to their flexibility can be compressed so as to be easily and economically shipped, stored and transported.

It is an object of the present invention to provide a thermoplastic structure wherein the resin or resins which comprise the inner sealant layer of the structure produces minimal detectable extractables during processing.

Another object of the present invention is to provide a thermoplastic structure as described above, which can be affixed by any type of lamination or coextrusion to a second film structure, a substrate or a combination of a second film structure and substrate to form a flexible, packaging film.

Another object of the present invention is to provide a flexible, packaging film, which can be used in the production of containers for the transporting and storing of organoleptic sensitive products.

A further object of the present invention is to provide a sealant composition for use in the production of containers for the storing and transporting of organoleptic sensitive products.

A still further object of the present invention is to provide a sealant composition for use in the packaging of organoleptic sensitive products which can be applied as a coating to a film structure or container.

The foregoing objects are attained by providing a sealant composition wherein the resin or resins which comprise the sealant composition produce minimal detectable extractables during processing. These sealant composition can then be used in the production of thermoplastic structures which may be formed into flexible packaging film and then into containers for the storage and transport of organoleptic sensitive products. Other objects, advantages, and sealant features of the present invention will become apparent from the following detailed description, which, when taken in conjunction with the annexed drawings discloses preferred embodiments of the present invention.

DEFINITIONS

As used herein, the word "beverage" is defined as a liquid for drinking which can be exemplified but not limited to water, fruit juices, carbonated drinks, liquids derived from animals and/or other synthetic or artificial means. The term beverage also includes any organoleptic sensitive liquid that might or might not be used for human consumption but that can be packaged in such flexible container.

As used herein, the term "coextrusion" refers to the process of extruding two or more materials through a single die with two or more orifices arranged so that the extrudates merge and weld together into a laminar structure before chilling, i.e., quenching or air cooling. Coextrusion can be employed in film blowing, free film extrusion, and extrusion coating processes.

As used herein, the term "extractables" refers to volatile components which are resin by-products produced during resin processing.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the phrase "inner sealant layer" or "sealant layer", with respect to multilayer films, refers to that layer which is in direct contact with the product.

As used herein, the term "lamination", and the phrase "laminated film", refer to the process, and resulting product, made by bonding together two or more layers of paper, flexible substrate, plastic films or other materials. Laminations can be accomplished by joining layers with adhesives, joining with heat and pressure, and even spread coating and extrusion coating. Multilayer films can be made via coextrusion and/or lamination.

As used herein, the phrase "middle layer" refers to any paper, flexible substrate such as a film layer, of a multilayer film, having its two principal surfaces with other layers of the multilayer film.

As used herein, the word "organoleptic" is defined as affecting or employing one or more of the senses such as taste, smell, etc.

As used herein, the phrase "organoleptic sensitive products" refers to substances whose physical properties (taste, smell, odor, etc.) can be affected by its environment. Organoleptic sensitive products can be exemplified by, but not limited to, beverages, such as water; food products which be further exemplified, but not limited to, fruit purees, fruits such as avocados, and syrups; non-food products which can be further exemplified by oils such as mineral oil and alcohol base solutions such as witch hazel.

As used herein, the phrase "outer layer" refers to any paper or any other flexible substrate such as a plastic film layer, of a multilayer construction, having only one of its principal surfaces adhered to another layer of the film. The "outer layer" also refers to that layer of a multilayer film structure wherein one of the surfaces of the outer layer can be affixed to a surface of another independent film structure or substrate.

As used herein, the phrase "stand-alone film" refers to a film structure which is not affixed to a second structure.

As used herein, the phrase "tie layer" refers to any internal layer having the primary purpose of adhering two layers to one another.

BRIEF DESCRIPTIONS OF THE DRAWINGS

Referring to the drawings which form a part of this disclosure.

FIG. 1 shows a seven-layer thermoplastic structure of the present invention.
FIG. 2 shows the seven-layer thermoplastic structure of FIG. 1 affixed to a substrate.
FIG. 3 shows a container of the present invention in the shape of a pouch.
FIG. 4 shows a mono-layer thermoplastic structure of the present invention.

DETAILED DESCRIPTION OF THE INVENTION

According to the present invention, there is provided a thermoplastic structure comprising an outer layer, a middle layer or layers and an inner sealant layer, wherein the outer layer comprises a polyolefin material, polyamide or any commonly used resin in the film making process, the middle layer or layers each comprise a material which is exemplified by but not limited to ethylene vinyl alcohol copolymers, PVdC, polyethylenes and polyamides and the inner sealant layer comprises polyethylenes having a density from about 0.88 to about 0.96. The above described structure may be a stand-alone structure or may be affixed to a second structure wherein said second structure may be another film structure or a substrate which may be printable or a combination of film structure and substrate. The said structure is affixed to a second structure by technology known to those skilled in the art, and which can be exemplified by but not limited to lamination and coextrusion. While the above described structure has been described as having at least three layers it is also within the scope of the present invention that the structure could also be a two-layer film structure or a mono-layer film structure with the understanding that at least one layer of the structure comprises a sealant resin selected from polyethylenes having a density from about 0.88 to about 0.96.

It is also within the scope of the present invention that the thermoplastic structures may also comprise one or more additional layers wherein these layers may independently comprise a polymeric resin, such as polypropylene or ethylene either as a homopolymer or a polymer in conjunction with a copolymer, a color concentrate in a polymer base; a second barrier material; slip and additives, and an adhesive or tie material. These enhanced thermoplastic structures may be used as stand alone structures or may also be affixed to the second film structure which as been described above.

The above described thermoplastic structures are produced by coextrusion technology wherein the extrusion temperature is below 500° F.; preferably the temperature is between about 150° to about 500° F.; most preferably the temperature is between 340° to about 470° F. Production of the thermoplastic structures within this range minimizes the formation of compounds or extractables that will negatively impact the properties (taste, smell, etc.) of organoleptic sensitive products.

The thermoplastic structures of the present invention can be affixed to a second structure to form a flexible packaging film, which can be formed into containers for the transporting and storing of organoleptic sensitive products. It is also understood that the thermoplastic structure, independently, can also form the flexible packaging film of the present invention.

It is also within the scope of the present invention to provide a sealant composition for use in thermoplastic structures or as coatings for the packaging of organoleptic sensitive products wherein said composition comprises a polyethylene having a density from about 0.88 to about 0.96 and wherein said sealant composition produces little or no extractable material during processing. It is to be understood that the sealant composition is present in that layer of a structure or coating which comes in direct contact with the organoleptic sensitive product.

PREFERRED EMBODIMENTS

A first preferred embodiment for the thermoplastic structure of the present invention is comprised of a seven layer coextruded film having an outer layer, a middle layer, a tie layer, a second middle layer, a third middle layer, a tie layer and an inner sealant layer, wherein the outer layer and the middle layer in direct contact with the outer layer comprises linear low polyethylene in an amount about 30–50% based on the total weight of the layer; a tie layer in an amount of about 10–20% based on the total weight of the layer, the second middle layer comprises poly (hexamethylene adipamide) in an amount about 10–20% based on the total weight of the layer; the third middle layer comprises ethylene vinyl alcohol copolymer in an amount about 1–20% based on the weight of the layer; a tie layer in an amount about 1–20% based on the total weight of the layer, and the inner sealant layer comprises a metallocene catalyzed polyethylene having a density of about 0.90 in an amount about 1–20% based on the weight of the layer and a slip additive in an amount of 1–10% based on the weight of the layer. The above described preferred structure is produced utilizing an extrusion temperature of between about 300 to about 500° F.

The above-described first embodiment is adhesive laminated to polyethylene terephthalate (PET) film structure by adhesive lamination technology.

A second preferred embodiment for the thermoplastic structure of the present invention is comprised of a three layer coextruded film having an outer layer, a middle layer and an inner sealant layer wherein the outer layer comprises a metallocene catalyzed polyethylene having a density of about 0.90 in an amount of about 10–50% based on the total weight of the layer; the middle layer comprises linear low density polyethylene in an amount of about 20–80% based on the total weight of the layer; the inner sealant layer comprises metallocene catalyzed polyethylene having a density about 0.90 in an amount of about 10–50% based on the total weight of the layer and a slip additive-erucamide in an amount of about 1–10% based on the total weight film.

The above-described second embodiment is adhesive laminated to a mono-layer PET film structure by adhesive lamination.

A third preferred embodiment for the thermoplastic structure of the present invention is comprised of a three-layer coextruded film comprising a first outer layer, a middle layer and an inner sealant layer wherein the outer layer comprises metallocene catalyzed polyethylene having a density of about 0.90 in an amount of about 10–50% based on the total weight of the layer; the middle layer comprises orientated polypropylene (OPP) in an amount of about 20–80% based on the total weight of the layer and the inner sealant layer comprises metallocene catalyzed polyethylene having a density of 0.90 in an amount of 10–50% based on the total weight of the layer and a slip additive erucamide in an amount of 1–10% based on the total weight of the layer.

The above-described third embodiment is adhesive laminated to a film structure comprising PET and PVdC.

The thermoplastic structures of the present invention are designed to be affixed by lamination or coextrusion to a second film structure or substrate. The combination of thermoplastic structure and a second film structure or substrate comprises the flexible packaging film structure of the present invention, which are then formed into containers for the storing and transporting of organoleptic sensitive products. The thermoplastic structures of the present invention are preferably adhesive laminated to the second film structure or substrate. Adhesives useful in the lamination process can be exemplified by but not limited to solvent based, water based, solventless, etc.

The film structures or substrates to which the thermoplastic structures of the present invention are affixed can comprise one or more layers. Each of the layers independently can comprise a component or a component blend wherein the component can be exemplified by but not limited to polyesters such as polyethylene terephthalate, polypropylenes, polyamides such as poly(hexamethylene sebacamide) and poly(hexamethylene adipamide) cellophane, aluminum foil and metallized substrates which can be further exemplified by oriented polyesters, oriented polypropylene, oriented polyamides and paper. The substrates may also have a printed text on their surface.

The flexible packaging films of the present invention can be formed into container for the storing and transporting of organoleptic sensitive products. These containers are made by technology known to those skilled in the art and can have a multitude of shapes. The shape and structure composition of the containers for storing and transporting the organoleptic sensitive products will be governed by the particular problems to be addressed.

DETAILED DESCRIPTION OF THE DRAWINGS

FIG. 1 illustrates a seven-layer thermoplastic structure of the present invention comprising outer layer (10), middle layer (12), tie layers (14), a middle layer (16), middle layer (18), tie layer (14) and an inner sealant layer (20). The sealant films structure of FIG. 1 can be adhesive laminated to a second film structure or substrate.

Outer layer (10) and middle layer (12) independently comprise a linear low density polyethylene; tie layers (14) comprises a linear low density polyethylene adhesive; middle layer (16) comprises poly(ε-caprolactam); middle layer (18) comprises ethylene vinyl alcohol copolymer (EVOH); and the inner sealant layer (20) comprises a metallocene catalyzed polyethylenes having a density from about 0.88 to about 0.96. The inner sealant layer may also comprise a slip additive such as erucamide, steramide or oleamide.

Figures 1, 2, 3:
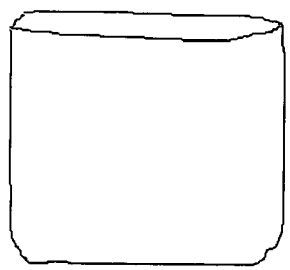
FIG. 2 illustrates the thermoplastic structure of FIG. 1 having layers (10), (12), (14), (16), (18) and (20) which is adhesive laminated to substrate (22). Substrate (22) comprises a mono-layer film structure comprising polyethylene terephthalate.
FIG. 3 illustrates a container of the present invention in the shape of a pouch, which is made from the film illustrated in FIG. 2.

The pouch is formed by heat sealing two film sheets together.

FIG. 4 illustrates a thermoplastic structure having a single layer (20) wherein layer (20) comprises a metallocene catalyzed polyethylene having a density from about 0.88 to about 0.96.

In a broader application of the thermoplastic structures, the first outer layer and the middle layer in direct contact with the outer layer may independently comprise a blend of resins or a single resin wherein said resins may be independently selected from the group consisting of but not limited to polyethylenes (PE), metallocene catalyzed polyethylenes, ethylene vinyl acetate copolymer (EVA), polypropylenes (PP), propylene ethylene copolymers (PPE), ethylene normal butyl acrylate copolymer (ENBA), ethylene methyl acrylic acid copolymer (EMA), ionomers, and polyamides. These resins, or resin blends, may comprise various percentages of the total weight of the layer. The first outer layer or middle layer may also contain processing aids. These processing aids may be added to the layer as individual components during processing or the processing aids may be incorporated within the resin composition for the first outer layer.

The middle layer or layers other than the middle layer in direct contact with the outer layer of the structure may independently comprise a blend of resins or a single resin wherein said resin or resins would provide barrier properties to the thermoplastic structures. These resin or resins are independently selected from the group consisting of but not limited to ethylene vinyl alcohol copolymer, polyesters, PVdC, polypropylenes, polyamides, ionomers and acid copolymers.

While the middle layer or layers of the film structure have been illustrated has been between the outer layer of the thermoplastic structure and the inner sealant layer of the thermoplastic structure it is to be understood that an adhesive or tie layer may exist between the middle layer and a second middle layer; between the outer layer and a middle layer, and between a middle layer and the inner sealant layer. These adhesives may be independently selected from the group consisting of commonly known tie resin, which might include but are not limited to compounds made with some percentages of polyethylenes (PE), ethylene vinyl acetate copolymer (EVA), polypropylenes(PP), propylene ethylene copolymers (PPE), polyamides, ethylene normal butyl acrylate copolymer (ENBA), ethylene methyl acrylic acid copolymer (EMAA), ethylene acrylic acid (EAA), ethylene methylacrylate (EMA), and ionomers.

The inner sealant layer of the thermoplastic structure of the present invention may comprise a blend of resins or a single resin wherein said resins are independently selected from the group consisting of polyethylenes, metallocene catalyzed polyethylenes, ultra, very low or low density polyethylenes, low molecular weight polyethylenes, or any other polyolefin resin having a density from about 0.88 to about 0.96 and wherein each of the above-identified resins provides little or no extractable material during extrusion. Polyethylenes suitable for the practice of this invention may be further exemplified by polyethylene having a density of 0.88 and a melt point of 200° F.; a polyethylene having a density of 0.902 and a melt point of 350° F., and a polyethylene having a density of 0.96 and a melt point of 450° F. The inner sealant layer may also contain processing aids. These processing aids may be added to the layer as individual components during processing or the processing aids may be incorporated within the resin composition.

The thermoplastic structures of the present invention may range from about 0.1 mils to about 10.0 mils, with a normal range of about 1.5 mils to about 3 mils, and are preferably about 1.5 mils to about 2.5 mils.

In preferred embodiments of the structures of the present invention, the polymer material, which comprises the outer layer of the film structure of FIG. 1, and the middle layer in direct contact with the outer layer, is about 30 to about 50% by weight of the total thickness of the film structure with about 40% by weight being preferred. A polymeric material as a tie layer of about 10 to about 20% by weight of the total structure with about 15% being preferred. The polymeric material, which comprise the middle layers of the film structure of FIG. 1, is about 1 to about 20% by weight of the total thickness of the film structure with about 15% by weight being preferred. A polymeric material as a tie layer of about 10 to about 20% by weight of the total structure with about 15% being preferred The polymeric material which comprises the inner sealant layer of the film structure of FIG. 1 is about 1% by weight to about 20% by weight with about 13% by weight being preferred.

Films of the present invention can be formed by any of the conventional processes for making multi-layer films, including laminations, extrusions, coextrusions, blown extrusion, cast extrusion, tubular water quenched extrusion, extrusion coatings, and the like, and combinations thereof. Coextrusion is presently preferred for forming the multi-layer thermoplastic structures, of the present invention with lamination being used to add the thermoplastic structure to a second film structure or substrate. An embodiment of the present invention includes a lamination process where the use of a solventless adhesive to join the outer substrate to the thermoplastic structure is preferred.

The following non-limiting examples are given by way of illustration and are not intended to be considered a limitation of this invention.

EXAMPLE 1

In the below-described test film structures of the present invention, which are described under "Samples Tested" were formed into pouches for storing water. The below-described test was used to determine if any taste difference could be detected between the water, which was stored in the test pouches which were made from the film structures of the present invention and the control water stored in a bottle.

Hedonic Test I

Objective To determine if taste differences in water are detected when samples made from film structures of the present invention are compared with polycarbonate bottle structures.

Samples Tested

| Samples Evaluated | Variable #1 | Variable #2 | Variable #5 |
|---|---|---|---|
| Structures | 48 PET/adhesive/ 3.00 mil coex LLDPE-Nylon-EVOH-Metallocene (slip #1) | 48 PET/adhesive/ 3.00 mil coex (LLDPE-Nylon-EVOH-Metallocene (slip #2) | 92 PET/adhesive/ 2.00 mil coex LLDPE-Nylon-EVOH Metallocene (slip #2) |

Note:
All variables have metallocene catalyzed LLDPE as sealant layer.

CONCLUSION

No significant taste intensity differences were detected.

Preparation

| | |
|---|---|
| Test medium | Ozarka brand drinking water (300 ml) |
| Sample | Multi layer film (5 × 5 pouches) |
| Contact time | 20 hours at room temperature |
| Serving temperature | Room temperature |

Test Method

Water rinses were used between taste samples. The replicate set of samples provided a measure of test reproducibility.

| | |
|---|---|
| Number of panelist | 30 |
| Test type | Ranking and Hedonic Acceptability Scale |
| Sample codes | Random 3 digit |
| Test design | Balanced block |
| Fatigue minimization | Ozarka water |
| Replicate served | Yes |

Descriptors

| TASTE | Variable #1 | Variable #2 | Variable #5 |
|---|---|---|---|
| No taste | 12 | 10 | 10 |
| Bitter | 3 | 3 | 5 |
| Musty | 2 | 0 | 1 |
| Salty | 2 | 0 | 0 |
| Metal | 1 | 2 | 2 |
| Plastic | 1 | 2 | 1 |
| Moldy | 1 | 2 | 0 |
| Sour | 1 | 1 | 2 |
| Spicy | 1 | 1 | 1 |
| Acidic | 1 | 1 | 0 |
| Waxy | 1 | 0 | 1 |
| Clean | 1 | 0 | 0 |
| Greasy | 1 | 0 | 0 |
| Oily | 1 | 0 | 0 |

Descriptors

| TASTE | Variable #1 | Variable #2 | Variable #5 |
|---|---|---|---|
| Old | 1 | 0 | 0 |
| Sharp | 1 | 0 | 0 |
| Dirt | 0 | 1 | 1 |
| Dry | 0 | 1 | 1 |
| Stale | 0 | 1 | 1 |
| Cardboard | 0 | 1 | 0 |
| Sweet | 0 | 0 | 2 |

Hedonic Acceptability Scale

| Sample | Taste |
|---|---|
| Variable #1 | 4.63 (Neither like/dislike) |
| Variable #2 | 4.67 (Neither like/dislike) |
| Variable #5 | 4.60 (Neither like/dislike) |

Hedonic Acceptability Scale:
1 = Dislike extremely
9 = Like extremely
Note
Ozarka brand drinking water historically and consistently rates −5.22 (Neither like/dislike) on the Hedonic Acceptability Scale.

Hedonic Acceptability Scale

| Sample | Taste |
|---|---|
| Variable #1 | 4.38 (Dislike slightly) |
| Variable #2 | 4.46 (Dislike slightly) |
| Variable #5 | 4.38 (Dislike slightly) |
| Ozarka Brand Drinking Water | 4.25 (Dislike slightly) |

Hedonic Acceptability Scale:
1 = Dislike extremely
9 = Like extremely
Note
Ozarka brand drinking water historically and consistently rates −5.22 (Neither like/dislike) on the Hedonic Acceptability Scale.

Hedonic Test II

Objective

To determine if taste differences in water are detected when samples made from film structures of the present invention are compared with polycarbonate bottle structures.

Samples Tested

| Samples Evaluated | Variable #1 | Variable #2 | Variable #3 | Ozarka Brand Drinking Water |
|---|---|---|---|---|
| Structures | 48 PET/adhesive/ 3.00 mil coex (slip #1) | 48 PET/adhesive/ 3.00 mil coex (slip #2) | 92 PET/ adhesive/2.00 mil coex (slip #2) | Polycarbonate bottle |

CONCLUSION

No significant taste intensity differences were detected.

Preparation

| TASTE | |
|---|---|
| Test medium | Ozarka brand drinking water (300 ml) |
| Sample | Multi layer film (5 × 5 pouches) |
| Contact time | 20 hours at room temperature |
| Serving temperature | Room temperature |

Test Method

Water rinses were used between taste samples. The replicate set of samples provided a measure of test reproducibility.

| | |
|---|---|
| Number of panelist | 30 |
| Test type | Ranking and Hedonic Acceptability Scale |
| Sample codes | Random 3 digit |
| Test design | Balanced block |
| Fatigue minimization | Ozarka water |
| Replicate served | Yes |

Descriptors

| TASTE | Variable #1 | Variable #2 | Variable #5 | Ozarka Brand Drinking Water |
|---|---|---|---|---|
| No taste | 10 | 11 | 8 | 8 |
| Bitter | 5 | 5 | 3 | 6 |
| Stale | 3 | 3 | 2 | 3 |
| Metallic | 1 | 1 | 3 | 1 |
| Soapy | 1 | 0 | 1 | 0 |
| Clean | 1 | 0 | 0 | 0 |
| Dry | 1 | 0 | 0 | 0 |
| Off taste | 1 | 0 | 0 | 0 |
| Citric Acid | 0 | 1 | 1 | 1 |
| Plastic | 0 | 1 | 1 | 0 |
| Waxy | 0 | 1 | 1 | 0 |
| Paper | 0 | 1 | 0 | 1 |
| Sour | 0 | 1 | 0 | 0 |
| Musty | 0 | 0 | 2 | 2 |
| Sweet | 0 | 0 | 2 | 1 |
| Glue | 0 | 0 | 1 | 1 |
| Salty | 0 | 0 | 1 | 1 |

The test panel used for these hedonic tests belongs to an independent multinational resin supplier and has been fully trained in polymeric notes and sensory. This panel is part of a laboratory that is ISO 9000 certified.

EXAMPLE 2

A seven-layer film structure which is representative of the present invention was manufactured by coextrusion technology using the resins described below. The extrusion temperature for the inner sealant layer of the film structure of Example 2 was maintained at a temperature of about 350° F. The film structure of Example 2 may be laminated to a second film structure or substrate to form the flexible packaging film of the present invention.

| RMS | Resin | TOTAL CALIPER | 3.00 | | |
|---|---|---|---|---|---|
| | | Film Density (g/cc) | % of Layer Weight | % of Web Caliper | Layer Caliper (mil) |
| 1 | Outside | | | 25.0 | 0.75 |
| | LLDPE | 0.922 | 99.50 | | |
| | Process Aid | 0.912 | 0.50 | | |
| | Total | | 100.00 | | |
| 2 | | | | 15.0 | 0.45 |
| | LLDPE | 0.922 | 100.00 | | |
| | Total | | 100.00 | | |
| 3 | | | | 17.0 | 0.51 |
| | LLDPE | 0.922 | 85.00 | | |
| | Tie | 0.920 | 15.00 | | |
| | Total | | 100.00 | | |
| 4 | | | | 12.0 | 0.36 |
| | poly(ε-caprolactam) | 1.128 | 100.00 | | |
| | Total | | 100.00 | | |
| 5 | | | | 10.0 | 0.30 |
| | EVOH | 1.190 | 100.00 | | |
| | Total | | 100.00 | | |
| 6 | | | | 8.0 | 0.24 |
| | mPE | 0.909 | 85.00 | | |
| | Tie | 0.920 | 15.00 | | |
| | Total | | 100.00 | | |
| 7 | | | | 13.0 | 0.39 |
| | mPE | 0.909 | 98.00 | | |
| | slip | 1.046 | 1.00 | | |
| | Antiblock | 1.050 | 1.00 | | |
| | Total | | 100.00 | | |
| Layer 8 | Total | | | | |
| Layer 9 | Total | | | | |
| | Total | | 100.00 | | 3.00 |

What is claimed is:

1. A thermoplastic structure for use in the storing and transporting of organoleptic sensitive products comprising:

an outer layer comprising linear low density polyethylene;

a middle layer comprising linear low density polyethylene;

a tie layer comprising linear low density polyethylene adhesive;

a middle layer comprising poly(hexamethylene adipamide);

a middle layer comprising ethylene vinyl alcohol copolymer;

a tie layer comprising linear low density polyethylene adhesive; and an inner sealant layer comprising a metallocene catalyzed polyethylene having a density of about 0.90 wherein the polyethylene is extruded at a temperature of about 350° F.; and wherein said outer layer is adhesive laminated to a film structure comprising poly(ethylene terephthalate).

2. A container for storing and transporting organoleptic sensitive products wherein the container is made from the structure of claim 1.

3. The container for storing and transporting organoleptic sensitive products according to claim 2 wherein the container is a pouch.

4. A thermoplastic structure for use in the storing and transporting of organoleptic sensitive products comprising:
- an outer layer comprising a metallocene catalyzed polyethylene having a density of about 0.90;
- a middle layer comprising linear low density polyethylene; and
- an inner sealant layer comprising a metallocene catalyzed polyethylene having a density of about 0.90 wherein the polyethylene is extruded at a temperature of about 350° F.; and wherein said outer layer is adhesive laminated to a film structure comprising poly(ethylene terephthalate).

5. A container for storing and transporting organoleptic sensitive products wherein the container is made from the structure of claim 4.

6. The container for storing and transporting organoleptic sensitive products according to claim 5 wherein the container is a pouch.

7. A thermoplastic structure for use in the storing and transporting of organoleptic sensitive products comprising:
- an outer layer comprising a metallocene catalyzed polyethylene having a density of 0.90;
- a middle layer comprising orientated polypropylene; and
- an inner sealant layer comprising a metallocene catalyzed polyethylene having a density of about 0.90 wherein the polyethylene is extruded at a temperature of about 350° F.; and wherein said outer layer is adhesive laminated to a film structure comprising a blend of poly(ethylene terephthalate) and PVdC.

8. A container for storing and transporting organoleptic sensitive products wherein the container is made from the structure of claim 7.

9. The container for storing and transporting organoleptic sensitive products according to claim 8 wherein the container is a pouch.

* * * * *